Jan. 11, 1927.  H. WEICHSEL  1,614,093
ALTERNATING CURRENT MOTOR
Filed Nov. 4, 1925
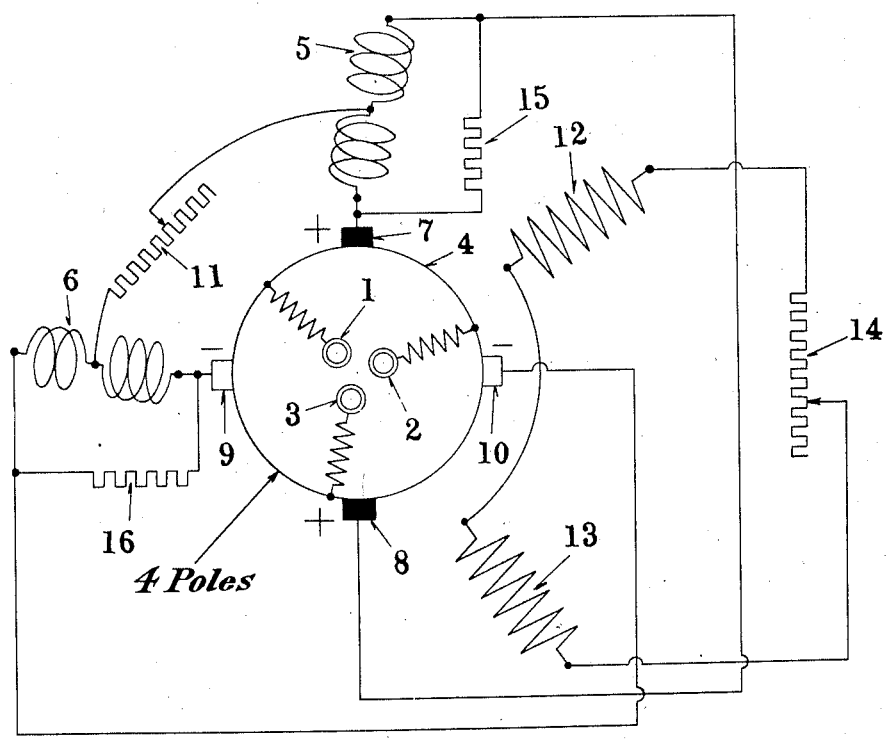
INVENTOR
Hans Weichsel
BY E. E. Huffman
ATTORNEY Patented Jan. 11, 1927.

1,614,093

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed November 4, 1925. Serial No. 66,690.

This invention relates to an improvement in the alternating current dynamo electric machine described in my co-pending application Serial No. 713,422 filed May 15, 1924, which issued as Patent No. 1,575,729, dated March 9, 1926. In that application I described a multi-polar alternating current motor in which the use of the usual cross-connectors between brushes of like polarity is avoided. My present invention comprises the addition to such machine of means for reducing the sparking at the commutator brushes which would otherwise result from momentary imperfect contact between them and the commutator, a condition which is common in commutator machines on account of high or low segments or high insulation between segments.

My invention is applicable to single phase as well as polyphase motors and to those having any number of poles more than two. In the accompanying drawing I have illustrated a four-pole polyphase synchronous motor embodying my invention.

The rotor and stator are preferably constructed without defined polar projections and with small air gap, as is usual in induction motors. In the machine shown the rotor is the primary member and is provided with a polyphase winding supplied with current through slip rings 1, 2 and 3 and with a four-pole commuted winding 4. The stator is provided with exciting windings 5 and 6 adapted to produce four-pole magnetization, and on the commutator are located two pairs of brushes 7, 8 and 9, 10. As shown, these brushes are displaced by a small angle from the axes of the windings for the purpose of producing a good synchronizing torque and a unidirectional excitation in synchronous operation, one component of which is so located as to satisfactorily influence the power factor as described in my Patent No. 1,553,345 issued September 15, 1925. Each exciting winding is connected in series with brushes of like polarity, winding 5 being in series with positive brushes 7, 8, and winding 6 in series with negative brushes 9, 10. With this arrangement any cross-currents between brushes of like polarity—which may result from inexact spacing of the brushes, slight eccentricity of the rotor with respect to the stator, and variation of magnetic density from other causes—have a path through the exciting windings. Due to the resistance of these windings the magnitude of these currents and therefore the losses and disturbing effects thereof are very greatly minimized. The circuit between the positive and negative brushes is completed by connecting the middle points of the windings 5 and 6, this connection being through adjustable resistance 11. It will be understood that the drawing is not intended to show the actual space positions of the parts of windings 5 and 6 on opposite sides of the points connecting to resistance 11. The two parts of these windings magnetize in opposite directions and are on opposite sides of the armature. The stator is also provided with starting windings 12 and 13 connected in series through adjustable resistance 14 and having their axes displaced, preferably by 90 electrical degrees, from the axes of the exciting windings.

Referring to the operation of the motor described, at starting the resistances 11 and 14 are adjusted to suitable value and the slip rings are connected to the supply. The windings 5, 6 and 12, 13 act as polyphase secondary windings and the machine starts with good torque and relatively small current. As the speed increases the resistances 11 and 14 can be reduced in one or more steps until the windings 12 and 13 are short-circuited and the resistance 11 brought to its operating value. It will be understood that at synchronism unidirectional current will be supplied to the exciting windings from the commutator and a unidirectional exciting magnetization thereby produced.

As thus far described the machine is the same as that illustrated and described in my co-pending application herein referred to. According to my present invention non-inductive resistance 15 is provided which interconnects positive brushes 7, 8, and a similar resistance 16 which interconnects negative brushes 9, 10. While these resistances will of course carry a portion of the cross-currents hereinbefore referred to, their purpose is to suppress sparking at a brush due to momentary imperfect contact between it and the commutator. If, for example, electrical connection between brush 7 and the commutator is broken a circuit remains for the current existing at the time of the break, such circuit including the resistance 15. The dying down of the current is therefore so retarded that the self-induction potential due to this action does not reach a high enough value to produce a spark between brush 7 and the commutator. I have found it possible to so proportion the resistances that the maximum difference in potential between brushes of like polarity, which can be produced by the most abrupt breaking of the connection between one of the brushes and the commutator, does not exceed 5 volts.

Having fully described my invention, what I claim as new and desire to secure by Letetrs Patent of the United States is:

1. In an alternating current motor, the combination of an inducing member provided with a commuted winding, an induced member provided with a plurality of exciting windings adapted to produce an N-pole magnetization of more than two poles, a plurality of brushes on the commutator, one of said exciting windings being connected in series with a pair of brushes of positive polarity and a second exciting winding being connected in series with a pair of brushes of negative polarity, means for interconnecting said exciting windings, and a resistance connecting brushes of like polarity.

2. In an alternating current motor, the combination of an inducing member provided with a commuted winding, an induced member provided with a plurality of exciting windings adapted to produce an N-pole magnetization of more than two poles, a plurality of brushes on the commutator, one of said exciting windings being connected in series with a pair of brushes of positive polarity and a second exciting winding being connected in series with a pair of brushes of negative polarity, means for interconnecting said exciting windings, a resistance connecting the brushes having positive polarity, and a second resistance connecting the brushes of negative polarity.

3. In an alternating current motor, the combination of an inducing member provided with a commuted winding, an induced member provided with means for producing an N-pole exciting magnetization of more than two poles, positive and negative exciting brushes on the commutator, additional positive and negative brushes, each displaced from a brush of like polarity by substantially 360 electrical degrees or a multiple thereof, and means including resistances for interconnecting brushes of like polarity, each of said interconnections being so made that the resistances do not carry any substantial current when the brushes which they interconnect are both in contact with the commutator.

In testimony whereof, I hereunto affix my signature, this 26th day of October, 1925.

H. WEICHSEL.